3,539,497
METHOD FOR DISTILLATION
Richard D. Monday, Wood Dale, Ill., assignor to Universal Oil Products Company, Des Plaines, Ill., a corporation of Delaware
Filed May 29, 1968, Ser. No. 733,028
Int. Cl. B01d 3/00; C10g 5/00
U.S. Cl. 208—103        3 Claims

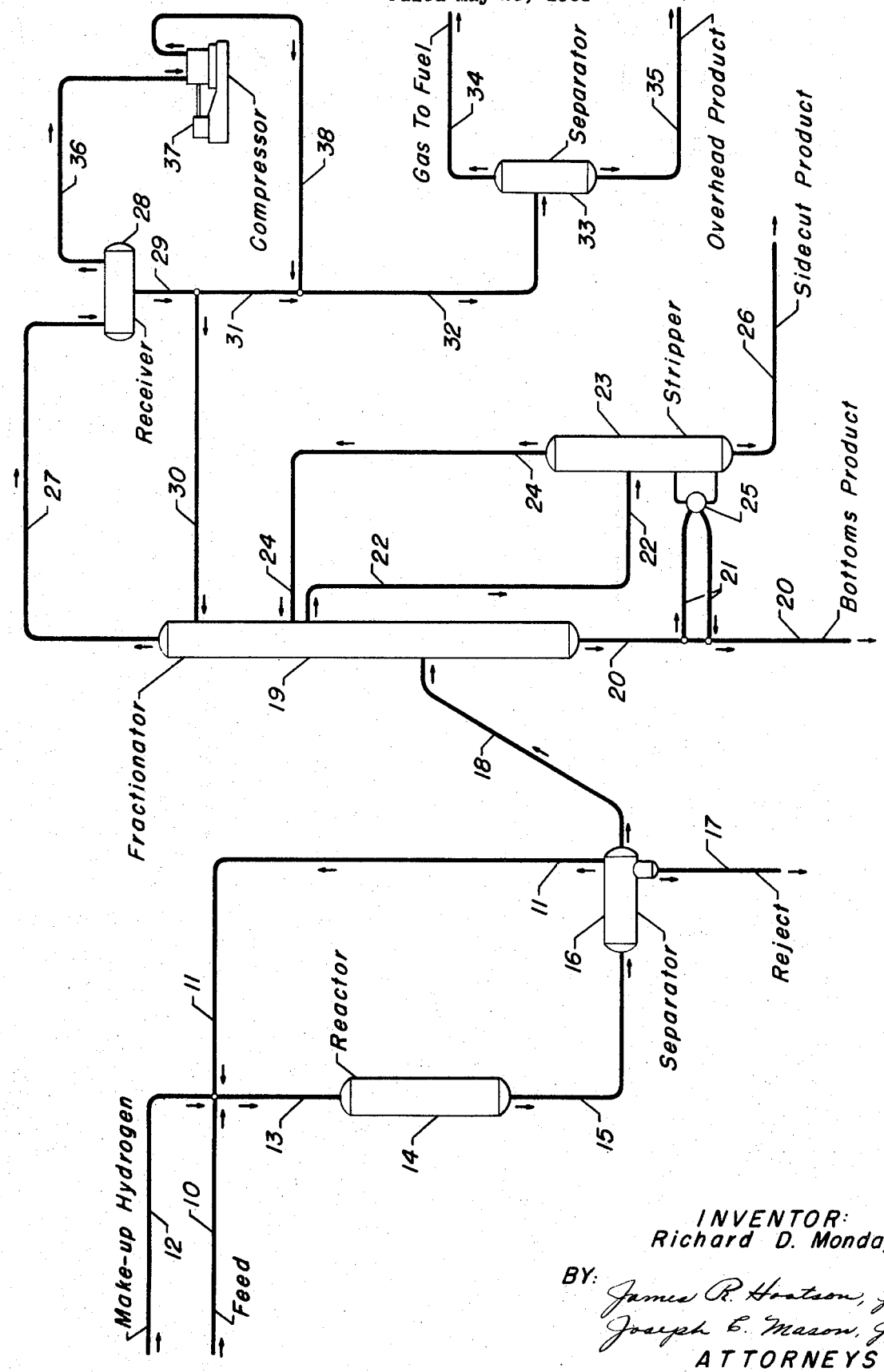

ABSTRACT OF THE DISCLOSURE

Method for distilling a multi-component mixture, such as the effluent from a hydrogenation reaction zone, which utilizes a fractionating column and a stripper column operating in combination with an overhead compressing means whereby the overhead vapors are compressed and then contacted with the liquid stream utilized as reflux on the column.

BACKGROUND OF THE INVENTION

This invention relates to a method for distillation. It particularly relates to a method for separating and recovering desired products from the hydrocarbon effluent of a hydrogenation conversion zone.

The practice of distillation is widely used in the chemical and petroleum industries for separating and recovering desired products usually manufactured through chemical reaction or usually obtainable from raw materials, such as crude petroleum. In today's complex economy, it has become increasingly apparent that the chemical engineering tool of distillation must be further improved in order to make such operation more economically attractive.

Accordingly, prior art schemes have developed various techniques of maintaining fractionating columns in thermal balance, such as dual internally located reboiler systems, side-cut strippers, overhead partial condensing and the like; each of which is familiar to those skilled in the art. In virtually every prior art scheme there is embodied a desire for minimizing the cost of obtaining desirable and predetermined products from a multi-component feed mixture. In many cases the number of desired components makes it impractical to utilize a single fractionating column so the prior art schemes have generally resorted to a plurality of fractionators commonly called a "distillation train" in order to separate and recover such desired products.

Since the art of distillation is essential to the successful practice of chemical processing, it would be desirable to further improve upon distillation methods.

Additionally, the chemical industry and, to a considerable extent, the petroleum industry, have resorted to hydrogenation techniques with every increasing regularity. The hydrogenation reaction, of course, requires careful control of operating conditions, but also embodies significant operating difficulties, such as recovery of relatively pure hydrogen for recycle purposes. In addition, the hydrogenation reaction generally produces normally gaseous hydrocarbons in commercially significant quantities so that ultimate recovery of the $C_1$ to $C_4$ hydrocarbons becomes increasingly desirable.

SUMMARY OF THE INVENTION

Therefore, it is an object of this invention to provide an improved method for distillation.

It is another object of this invention to provide an improved method for distilling a multi-component hydrocarbon feed mixture containing both normally liquid hydrocarbons and normally gaseous hydrocarbons.

It is a specific object of this invention to provide an improved method for separating and recovering desired products from the hydrocarbon effluent of a hydrogenation conversion zone in a facile and economical manner.

Accordingly, one embodiment of this invention provides a method for distillation which comprises introducing a multi-component feed mixture containing normally liquid and normally gaseous hydrocarbons into a fractionation column maintained under fractionation conditions; withdrawing from said column an overhead fraction containing said normally gaseous hydrocarbons, and a bottoms fraction comprising normally liquid hydrocarbons; separating said overhead fraction at relatively low pressure into a liquid portion and a gaseous portion; compressing said gaseous portion to a relatively high pressure; admixing said compressed gaseous portion at relatively high pressure with at least part of said liquid portion under conditions sufficient to absorb normally gaseous hydrocarbons into said liquid portion; and, separating said admixture into a gaseous product stream of reduced normally gaseous hydrocarbon content, and a liquid product stream.

A more specific embodiment of this invention includes the method hereinabove wherein said relatively high pressure is at least 25 p.s.i.g. higher than said relatively low pressure.

Illustrative of feedstocks which may be satisfactorily processed through the inventive method include hydrocarbon sources boiling in the middle and upper ranges of petroleum fractions and containing sulfur and nitrogen contaminants. These contaminants are conventionally removed through the well known conversion reaction of hydrogenation. Preferably, the present inventive method separates and recovers desired products from the hydrocarbon effluent of a hydrogenation conversion zone boiling mainly within the gas oil boiling range, e.g. from about 320° F. to about 675° F. Since the hydrogenation reaction is designed primarily to remove these sulfur and nitrogen contaminants, the boiling range of the feedstock and the boiling range of the hydrocarbon effluent are, for all practical purposes, the same. However, as with most chemical reactions, there is a certain amount of fragmentation or cracking which produces, particularly in a hydrogen atmosphere, normally gaseous hydrocarbons ranging from methane to butane.

The hydrogenation reaction to which this invention is particularly directed utilizes catalyst, preferably, selected from one of the platinum group metals of Group VIII of the Periodic Table composited with a refractory support, such as alumina, magnesia, zirconia, silica, or combinations of these metal oxides containing from 0.01 to 2.0 percent by weight of the platinum group metal on the composite or support. Utilizing a catalyst of this type, the hydrogenation reaction may be effected at temperatures from 300° F. to 1000° F., at pressures from 300 p.s.i.g. to 1000 p.s.i.g., and a hydrogen to hydrocarbon mol ratio of from 0.5:1 to 20:1.

Other suitable catalysts for certain hydrogenation reactions include an iron group metal of Group VIII of the Periodic Table with a sulfide of a metal selected from the right hand columns of Groups V and VI of the Periodic Table, such as vanadium, niobium, tantalum, chromium, etc. supported on one of the aforementioned refractory metal oxides, such as alumina, zirconia, etc. The preferred iron group metals are nickel and cobalt and the preferred metal sulfides are the thiomolybdates, thiovanadates and the sulfides of niobium and chromium.

Those skilled in the art are familar with hydrogenation reactions so additional details thereof need not be presented here.

The effluent from the hydrogenation reaction zone contains hydrocarbon components, such as normally liquid hydrocarbons and normally gaseous hydrocarbons admixed with unreacted hydrogen and by-product acid gases, such as hydrogen sulfide. This effluent is conventionally passed into a high pressure separation zone, after suitable cooling, for the separation therefrom of a hydrogen-containing gas stream having sufficient hydrogen content for reuse within the hydrogenation reaction zone and, therefore, conventionally this hydrogen stream is recycled to the conversion zone. Since hydrogenation reactions, by definition, consume hydrogen, suitable makeup hydrogen must be added to the system in order to maintain the proper hydrogen to hydrocarbon mol ratio within the reaction zone.

The remaining hydrocarbon effluent is next passed into a fractionation column which contains suitable vapor-liquid contacting devices, such as bubble cap trays, sieve-type trays, valve trays, suitable packing such as Berl saddles, etc. Those skilled in the art are familiar with internal fractionation column designs and any of these conventional configurations will generally be suitable for the practice of this invention.

As previously mentioned, one embodiment of this invention includes operating the fractionation column under conditions sufficient to produce an overhead fraction containing normally gaseous hydrocarbons admixed with sufficient condensable hydrocarbons, e.g. $C_6+$ hydrocarbons, such that liquid reflux may be obtained to provide proper operation of the fractionation column.

This total overhead stream is cooled and passed into separator-receiver means from which normally gaseous hydrocarbons, including residual hydrogen sulfide and hydrogen gas are separated from the condensed liquid material.

The condensed liquid is withdrawn from the receiver means and a portion thereof returned to the upper section of the fractionation column as reflux thereon.

The separated gaseous portion containing hydrogen and hydrogen sulfide is now passed in accordance with one essential concept of the present invention into compression means for the compression thereof to a pressure of at least 25 p.s.i.g. higher than the pressure maintained in the receiver. Preferably, the compressing is performed with one stage of compression and a compression ratio of from 2:1 to 5:1.

The compressed gaseous portion is now contacted directly with the remaining portion of the liquid material removed from the receiver. This admixture is thereafter passed into additional separation means wherein a gaseous product stream of reduced normally gaseous hydrocarbon content is separated and recovered, preferably, for use as fuel. The remaining normally liquid stream enriched with normally gaseous hydrocarbons is removed from this latter separator and recovered as an overhead product stream.

Broadly, the inventive method for distillation also embodies the withdrawal from the fractionation column of a bottoms product stream containing the normally liquid hydrocarbons which have been substantially desulfurized.

In a preferred embodiment of this invention, more particularly discussed hereinafter, a side-cut product stream is withdrawn from the fractionator column and in one specific embodiment passed into a side-cut stripper column which obtains its heat requirements by indirect heat exchange in the lower end of the stripper column with the bottoms product stream which was removed from the fractionator column as previously mentioned.

From the teachings presented herein, those skilled in the art will appreciate that the operating conditions for the fractionation column may vary over a wide range depending upon the characteristics of the multi-component feed mixture to be separated. Illustrative of one embodiment of this invention is the separation of the hydrocarbon effluent, boiling mainly within the gas oil boiling range and obtained from a hydrogenation conversion zone, at a fractionating column overhead temperature from 240° F. to 300° F. and an overhead column pressure from 0 p.s.i.g. to 20 p.s.i.g., a column bottoms temperature from 600° F. to 675° F., a side-cut stream obtained at a temperature from 450° F. to 525° F.

Thus, by operating under the suggested conditions hereinabove, the hydrocarbon effluent of a hydrogenation conversion zone boiling mainly within the gas oil boiling range is separated into desired products comprising a fuel fraction containing hydrogen and hydrogen sulfide; a normally gaseous hydrocarbon product stream, a liquid stream comprising light hydrocarbons, a side-cut stream comprising relatively light gas oil, and a bottoms product stream comprising relatively heavy gas oil.

As can be seen from the description presented thus far, many desired products are obtained by the inventive method of distillation in a facile and economical manner. The use of the compression step on the overhead vapor material enables increased recovery of desirable normally gaseous hydrocarbons for resale purposes at higher economic value than would otherwise be obtained by allowing these desirable normally gaseous hydrocarbons to leave the system through a conventional fuel outlet. Additionally, the preferred use of the side-cut stripper permits the removal of gaseous components from the relatively light gas oil thereby rendering the side-cut product more desirable as a desulfurized fuel oil and thereby permitting these lighter hydrocarbons to be recovered in the unique overhead system of the present invention. Similarly, economy of operation is obtained by utilizing at least a portion of the bottoms product stream as the source for heat requirements in the side-cut stripper column.

The invention may be more fully understood with reference to the appended drawing which is a schematic representation of apparatus for practicing one embodiment of the invention.

DESCRIPTION OF THE DRAWING

Referring more particularly to the attached drawing, the initial multi-component feedstock is brought into the system via line 10, mixed with recycle hydrogen from line 11, makeup hydrogen from line 12, preheated to incipient hydrogenation temperature by heater means, not shown, and passed directly into the top of reactor 14 via line 13. Reactor 14 contains a fixed bed of solid catalyst particles of the type previously described. On the other hand, reactor 14 may be of the moving bed type according to apparatus well known to those skilled in the art. It is not essential in the practice of this invention that reactor 14 be of any particular configuration. Desirably, reactor 14 contains a single fixed bed of catalyst; although, a plurality of catalyst beds, e.g. from 2 to 5, may be advantageously utilized. The reaction conditions are adjusted in accordance with the description previously mentioned in order to suitably reduce the sulfur and nitrogen content of the feed to predetermined levels.

The total hydrogenation effluent containing hydrogen, hydrogen sulfide, normally gaseous hydrocarbons, and normally liquid hydrocarbons is cooled by means not shown and passed via line 15 into high pressure separator 16. The pressure maintained in separator 16 is substantially the same as that maintained in reactor 14 allowing for conventional pressure drop through the system. In some cases, the material in line 15 is cooled by indirect heat exchange means, not shown, into which is also injected water for quench purposes and for purposes of removing any ammonia type salts which may tend to plug up the heat exchanger. If water is injected into line 15 it may be rejected from separator 16 via line 17. Hydrogen gas suitable for reuse in the reaction zone is withdrawn from separator 16 via line 11 and returned to reactor 14 in the manner previously described.

The remaining hydrocarbon effluent stream still containing residual amounts of hydrogen and hydrogen sulfide gas together with normally liquid hydrocarbons and normally gaseous hydrocarbons is withdrawn from separator 16 via line 18 and passed into fractionator column 19. Typically, the material in line 18 may be suitably preheated to distillation temperature by heat means not shown. Fractionator 19 is of the conventional type separating by distillation various desired products from a multi-component feed mixture of the type described herein.

Operating conditions are maintained in fractionator 19 sufficient to produce an overhead fraction comprising a mixture of normally liquid hydrocarbons, hydrogen, hydrogen sulfide, and normally gaseous hydrocarbons. This overhead fraction is passed after suitable cooling by means not shown into receiver 28 for the separation therein of a gaseous portion which is withdrawn via line 36 and a liquid portion which is withdrawn via line 29. A major portion of the material in line 29 is returned via line 30 as reflux into column 19. The gaseous portion in line 36 is passed into compressor 37 wherein its pressure is increased at least 25 p.s.i.g. over the pressure maintained in receiver 28. Typically, this pressure will be in the range from 30 to 60 p.s.i.g higher than the relatively low pressure maintained in receiver 28. The compressed gaseous portion is withdrawn from compressor 37 via line 38 and passed into admixture with the remaining liquid portion from line 29 which is being withdrawn via line 31. The material in line 29 has also been desirably increased in pressure by pumping means not shown. The admixture of liquid hydrocarbons and compressed gaseous hydrocarbons is now passed via line 32 into relatively high pressure separator 33. A gaseous product stream having reduced normally gaseous hydrocarbon content is withdrawn via line 34 and passed, preferably, into a fuel system. The remaining liquid hydrocarbons now enriched in normally gaseous hydrocarbons is withdrawn from separator 33 via line 35.

In the preferred embodiment of this invention a sidecut fraction comprising relatively light gas oil is withdrawn from fractionator 19 via line 22 and passed into stripper column 23 which has reboiler means 25 associated therewith. Suitable conditions are maintained in stripper 23 to remove an overhead product comprising light hydrocarbons which are returned to the column via line 24. The stripped relatively light gas oil product stream is withdrawn from the system via line 26.

A bottoms product stream comprising relatively heavy gas oil is withdrawn from column 19 via line 20. In the preferred embodiment of this invention the bottoms product stream is diverted via line 21 into indirect heat exchange with bottoms material from stripper 23 in reboiler means 25, previously mentioned. Sufficient bottoms product stream is diverted through line 21 in order to supply at least a portion of the heat requirements for stripper 23. It has been found that in normal operation all of the heat requirements for stripper 23 may be obtained by the heat content of the material in line 21 being passed through reboiler 25. Following use as reboiler heat, the bottoms product stream is withdrawn from the system via line 20.

PREFERRED EMBODIMENT

According to the description presented thus far, a preferred embodiment of this invention includes a method for separating and recovering desired products from the hydrocarbon effluent of a hydrogenation conversion zone boiling mainly within the gas-oil boiling range which comprises the steps of: (a) passing said hydrocarbon effluent to be separated into a fractionation zone at a temperature from 360° F. to 450° F. and a pressure from 5 p.s.i.g. to 25 p.s.i.g.; (b) removing from said zone a bottoms product comprising relatively heavy gas oil at a temperature from 600° F. to 675° F., a side-cut stream comprising relatively light gas oil at a temperature from 450° F. to 525° F., and an overhead fraction comprising a mixture of normally liquid hydrocarbons, hydrogen, hydrogen sulfide, and normally gaseous hydrocarbons at a temperature from 240° F. to 300° F. and a pressure from 0 p.s.i.g. to 20 p.s.i.g.; (c) separating said overhead fraction into a gaseous hydrocarbon stream and a liquid hydrocarbon stream at relatively low pressure; (d) compressing said gaseous stream of step (c) to a pressure at least 25 p.s.i.g. higher than said overhead pressure of step (b); (e) admixing the compressed gaseous stream with at least a portion of said liquid stream of step (c); and (f) introducing said admixture into a separation zone under conditions including relatively high pressure sufficient to produce a gaseous product stream containing said hydrogen, hydrogen sulfide, and a portion of said normally gaseous hydrocarbons, and a liquid product stream comprising normally liquid hydrocarbons.

A more specific preferred embodiment of this invention includes the method hereinabove further characterized by passing the side-cut stream into a side-cut stripper column having reboiler means associated therewith and introducing at least a portion of the bottoms product stream into said reboiler means to supply at least a portion of the heat requirements for the stripper column.

The invention claimed is:

1. Method for separating and recovering desired products from the hydrocarbon effluent of a hydrogenation conversion zone boiling mainly within the gas oil boiling range which comprises the steps of:

(a) passing said hydrocarbon effluent to be separated into a fractionation zone at a temperature from 360° F. to 450° F. and a pressure from 5 p.s.i.g. to 25 p.s.i.g.;

(b) removing from said zone a bottoms product comprising relatively heavy gas oil at a temperature from 600° F. to 675° F., a side-cut stream comprising relatively light gas oil at a temperature from 450° F. to 525° F., and an overhead fraction comprising a mixture of normally liquid hydrocarbons, hydrogen, hydrogen sulfide, and normally gaseous hydrocarbons at a temperature from 240° F. to 300° F. and a pressure from 0 p.s.i.g. to 20 p.s.i.g.;

(c) separating said overhead fraction into a gaseous hycarbon stream and a liquid hydrocarbon stream at relatively low pressure;

(d) compressing said gaseous stream of step (c) to a pressure at least 25 p.s.i.g. higher than said overhead pressure of step (b);

(e) admixing the compressed gaseous stream with at least a portion of said liquid stream of step (c); and (f) introducing said admixture into a separation zone under conditions including relatively high pressure sufficient to produce a gaseous product stream containing said hydrogen, hydrogen sulfide, and a portion of said normally gaseous hydrocarbons, and a liquid product stream comprising normally liquid hydrocarbons.

2. Method according to claim 1 further characterized by passing said side-cut stream into a side-cut stripper column having reboiler means associated therewith, and, introducing at least a portion of said bottoms product into said reboiler means to supply at least a portion of the heat requirements for said stripping.

3. Method according to claim 1 wherein said compressing uses one stage of compression and a compression ratio from 2:1 to 5:1.

References Cited

UNITED STATES PATENTS

| | | | |
|---|---|---|---|
| 3,402,124 | 9/1968 | Jones | 208—353 |
| 2,540,379 | 2/1951 | Ridgway et al. | 208—105 |
| 2,786,802 | 3/1957 | Hanisian et al. | 208—105 |
| 2,943,041 | 6/1960 | Johnston et al. | 208—104 |
| 3,054,745 | 9/1962 | Forbes et al. | 208—104 |
| 3,320,159 | 5/1967 | Potts | 208—354 |
| 3,362,903 | 1/1968 | Eastman et al. | 208—143 |
| 3,431,195 | 3/1969 | Storch et al. | 208—138 |

HERBERT LEVINE, Primary Examiner

U.S. Cl. X.R.

208—104, 143, 354